(12) United States Patent
Pasternak

(10) Patent No.: US 7,686,316 B2
(45) Date of Patent: Mar. 30, 2010

(54) PEDAL DRIVE MECHANISM

(76) Inventor: Peter David Pasternak, 2780 Autumn Dr., Crown Point, IN (US) 46307

( * ) Notice: Subject to any disclaimer, the term of this patent is extended or adjusted under 35 U.S.C. 154(b) by 117 days.

(21) Appl. No.: 11/607,146

(22) Filed: Nov. 30, 2006

(65) Prior Publication Data

US 2007/0120341 A1 May 31, 2007

Related U.S. Application Data

(60) Provisional application No. 60/740,650, filed on Nov. 30, 2005.

(51) Int. Cl.
*B62M 1/06* (2006.01)
(52) U.S. Cl. ........................ 280/221; 280/258
(58) Field of Classification Search .................. 280/221, 280/220, 252, 253, 255, 258
See application file for complete search history.

(56) References Cited

U.S. PATENT DOCUMENTS

| | | | | |
|---|---|---|---|---|
| 95,325 A * | 9/1869 | Coleman | ...................... | 74/143 |
| 334,325 A * | 1/1886 | Yost | ........................... | 280/258 |
| 483,495 A * | 9/1892 | Hunter | ........................ | 280/244 |
| 838,228 A * | 12/1906 | Williams | ..................... | 280/7.15 |
| 1,509,898 A * | 9/1924 | McConnell | ................... | 280/258 |
| 1,511,151 A * | 10/1924 | Wilson | ......................... | 280/255 |
| 4,779,863 A * | 10/1988 | Yang | ............................ | 482/51 |
| 6,024,369 A * | 2/2000 | Goldstein et al. | ............ | 280/248 |
| 6,241,269 B1 * | 6/2001 | Fan | .............................. | 280/265 |
| 6,619,682 B1 * | 9/2003 | Carr et al. | ..................... | 280/253 |
| 2005/0194759 A1 * | 9/2005 | Chen | ........................... | 280/221 |

* cited by examiner

*Primary Examiner*—Anne Marie M Boehler
(74) *Attorney, Agent, or Firm*—Richard C. Litman

(57) ABSTRACT

The pedal drive mechanism comprises a pedal arm immovably affixed across the secant of a drive gear, with the drive gear and attached pedal arm rotating through a partial revolution during operation. The drive gear meshes with a smaller pinion gear installed concentrically on the drive wheel axle. The pedal arm extends generally upwardly in its initial position prior to actuation of the mechanism, with operation requiring a rearward and downward kick or push. This is a natural motion for the operator of a scooter type vehicle, and the downward force also transfers a greater force to the drive wheel(s) for better traction during starting and operation. A return spring rotates the pedal arm, drive gear, and pinion gear back to their original starting positions when pressure is released on the pedal, with a one-way clutch disengaging the pinion gear from the drive wheel(s) during the pedal return stroke.

1 Claim, 3 Drawing Sheets

PEDAL DRIVE MECHANISM

Peter Pasternak claims the benefit of prior U.S. Provisional Patent No. 60/740,650 filed on Nov. 30, 2005

BACKGROUND OF THE INVENTION

1. Field of the Invention

The present invention relates generally to reciprocating drive mechanisms for rotating a wheel. More specifically, the present invention comprises a pedal with a spring return, which drives a one-way clutch to rotate a wheel. The device is particularly well suited for installation and use in scooters and similar lightweight, two or three wheeled vehicles.

2. Description of the Related Art

Small, unpowered scooters and similar wheeled vehicles are a very popular form of basic and recreational transportation. While the basic principle has been known for decades, various refinements and embellishments have been developed over the years. Many of these embellishments are directed to some means of driving at least one of the wheels of the device, using power provided by the operator of the vehicle. Most such systems use one or two pedals which is/are pumped upwardly and downwardly by the operator of the device to drive the wheel(s). The pedal(s) generally drive(s) a roller chain and/or gear train to transfer the pedal motion from a location and travel which is ergonomically comfortable for the operator, and/or to provide a rotary speed increase to the drive wheel for greater speed.

The present inventor is aware of a few such devices, as exemplified in various foreign patent publications. An example of such is found in German Patent No. 10,208,700, published on Sep. 11, 2003, which describes (according to the drawings and English abstract) a two-wheeled scooter having a double pedal drive mechanism. Each pedal is pivoted at its forward end and has a gear segment at its rearward end, with the gear segments driving opposed pinion gears on opposite sides of the single rear drive wheel. Free-wheel couplings are provided between the pinions and the rear drive wheel.

German Patent No. 10,215,278, published on Oct. 16, 2003, describes (according to the drawings and English abstract) another dual pedal drive scooter, with each pedal driving an elongate toothed rack, which engages a pinion gear to each side of the rear wheel hub. The pedal motion is generally vertical about a rearwardly disposed lateral shaft.

Finally, German Patent No. 10,312,878, published on Oct. 21, 2004, describes (according to the drawings and English abstract) a dual pedal drive system having pedals pivoted at their forward ends, and moving primarily up and down about their forward pivots. While the English abstract indicates that the pedals drive the two forward wheels of the device, the drawings appear to show a chain and gear train mechanism from the pedals to the single rear drive wheel.

None of the above inventions and patents, taken either singly or in combination, is seen to describe the instant invention as claimed. Thus, a pedal drive mechanism solving the aforementioned problems is desired.

SUMMARY OF THE INVENTION

The pedal drive mechanism comprises a single, relatively large drive gear (or large diameter gear segment), which rotates through a partial revolution and meshes with a smaller diameter pinion gear, which is concentric with the rear drive wheel hub of the vehicle. A one-way clutch (ratchet, ramp and jamming roller mechanism, etc.) is provided between the drive wheel(s) and pinion gear. The single pedal arm is immovably affixed relative to the drive gear, and extends across a secant of the drive gear and generally upwardly therefrom in an initial position prior to actuation. Kicking the pedal arm results in a partial rotation of the drive gear, which, in turn, transmits its rotary motion to the pinion gear to rotate the drive wheel(s) of the vehicle in a forward direction. The orientation of the pedal arm results in a downward and rearward force on the arm, which is a natural motion for a person starting off on a scooter or similar vehicle. Moreover, the downward kicking or pushing force imparts a greater downward force to the adjacent drive wheel, thus providing greater traction during the maneuver.

When pressure on the pedal arm is released, a return spring rotates the arm and its attached drive gear back to the initial position. The pinion gear is also rotated opposite the forward driving direction due to its meshing engagement with the drive gear, but the pinion gear is disengaged from the drive wheels during such reverse rotation due to a one-way clutch between the pinion gear and the drive wheel(s). This allows the drive wheel(s) to free wheel or coast during the return of the drive gear and pedal arm to their original positions.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
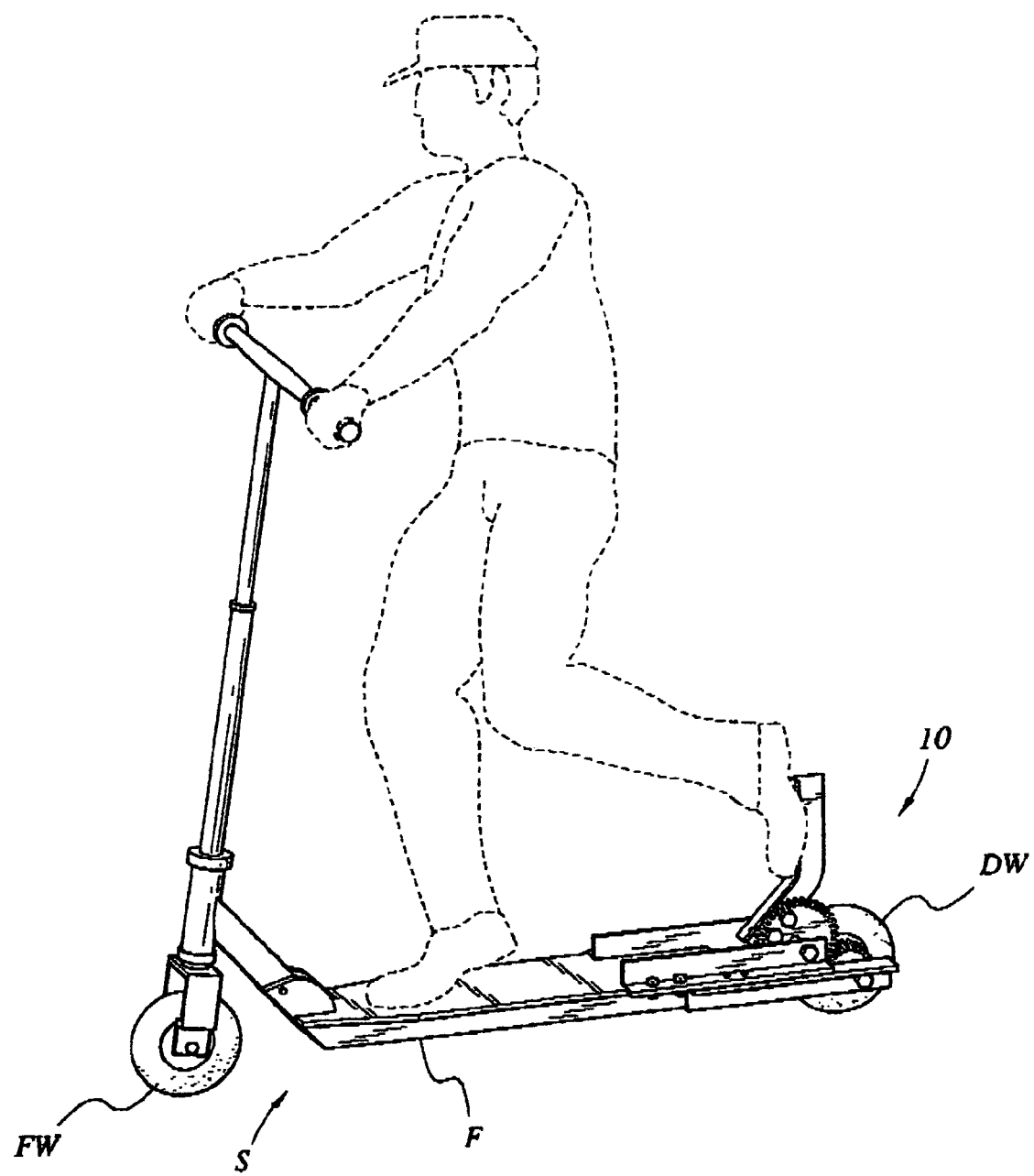
FIG. 1 is an environmental, perspective view of a two-wheeled scooter incorporating the present pedal drive mechanism.

The present invention comprises a pedal drive mechanism for a small, lightweight vehicle such as a scooter or the like. FIG. 1 of the drawings provides an illustration of such a scooter S incorporating the pedal drive mechanism 10, with FIGS. 2 and 3 providing detailed views of the drive mechanism 10 per se. The scooter S may be a conventional device, having at least a frame F, a front wheel FW, and at least one rearwardly disposed drive wheel DW. However, the specific configuration is not critical, and may include other conventional features, such as a handlebar and steering assembly, brakes, etc. However, it will be seen that the present pedal drive mechanism 10 may be incorporated with other types of lightweight vehicles, such as bicycles, tricycles, skateboards, etc., as desired.

Figure 2:
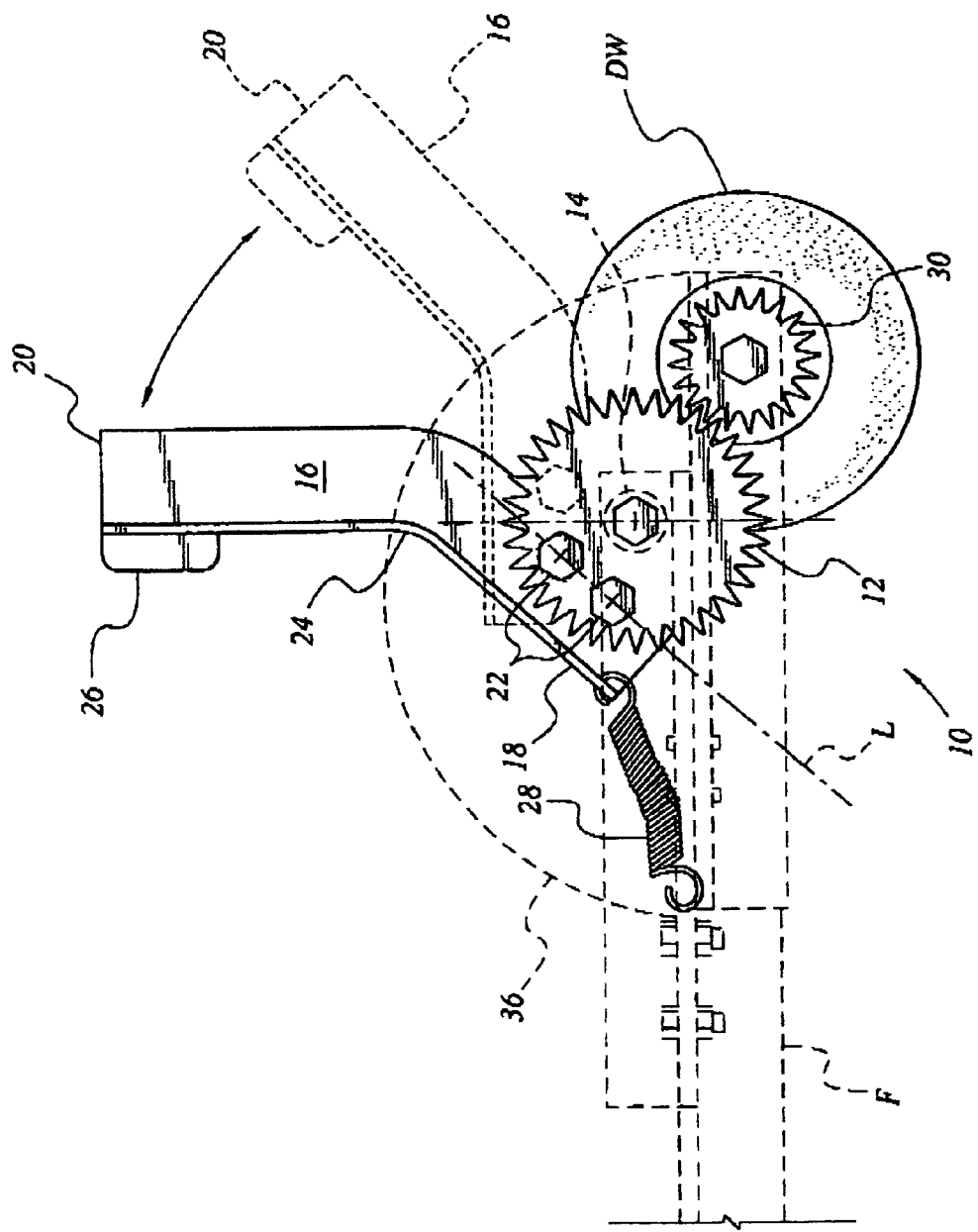
FIG. 2 is a left side elevation view of the pedal drive mechanism, showing further details thereof.
Figure 3:
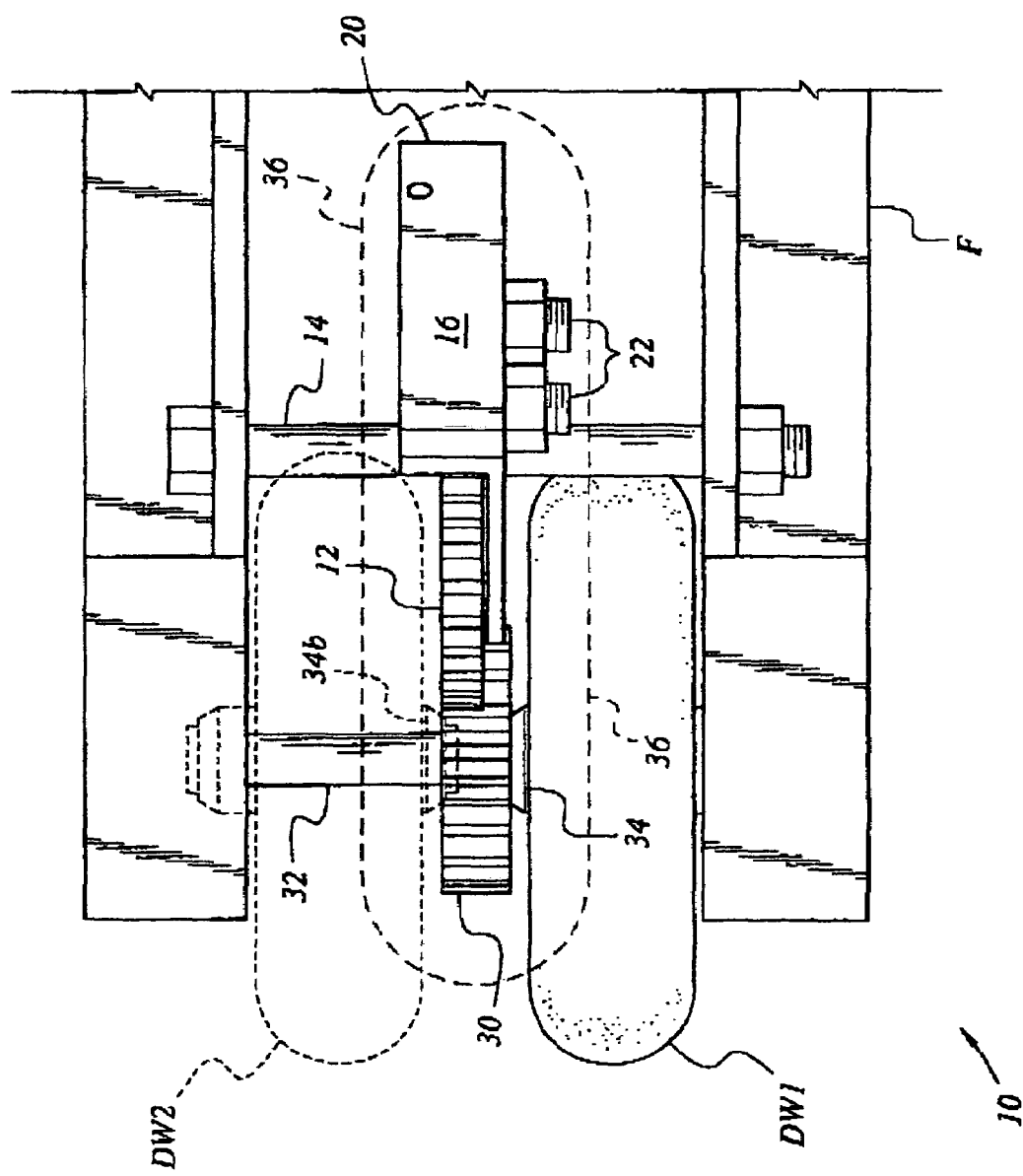
FIG. 3 is a top plan view of the pedal drive mechanism, showing further details and an alternative second drive wheel.

FIGS. 2 and 3 provide detailed views of the pedal drive mechanism 10, as noted above. The pedal drive mechanism 10 comprises a drive gear 12, which is disposed upon a lateral shaft 14, which is, in turn, secured across the frame F of the vehicle. A pedal arm 16 is immovably affixed to the drive gear 11Z and travels through a partial revolution along with the drive gear when the drive mechanism 10 is operated. The pedal arm 16 includes a drive gear attachment portion 18 and an opposite distal extension 20. The drive gear attachment portion 18 is affixed to the drive gear 12 along a line L defining a secant of the drive gear, i.e., a line passing through the are defined by the circular curvature of the periphery of the drive gear. The secant line L is offset from the center of the drive gear. Alternatively, the drive gear 12 may be a noncircular segment gear, i.e., having gear teeth extending only partially about the gear circle pattern. Bolts 22 or other fasteners may be used to affix the pedal arm 16 to the drive gear 12.

The pedal arm 16 preferably includes a generally medial bend 24 therein, with the bend orienting the elongate axis of the distal extension portion 20 of the arm 16 so that its axis is substantially in alignment with the axis of the lateral drive gear shaft 14. This positions the extension portion 20 of the pedal arm 16 in a substantially upward or vertical orientation, generally as shown in FIGS. 1 and 2, when the mechanism is in its initial position before actuation to drive the rear wheel (s) of the vehicle. A footpad 26 may be placed upon the distal end 20 of the pedal arm 16 for greater traction by the operator, if so desired. The pedal arm 16 is urged to this position by a return spring 28, which extends between a point on the frame F and the attachment portion 18 of the drive arm. As the drive arm 16 is immovably affixed to the drive gear 12, the return spring 28 also causes the drive gear to rotate back to this initial position when pressure is removed from the pedal arm 16.

The drive gear 12 meshes with and drives a smaller diameter pinion gear 30, which is rotationally affixed, to the rear drive wheel axle 32. As the pinion gear 30 is in continuous mesh with the drive gear 12, the pinion gear 30 is correspondingly restricted in its rotation to a relatively small number of revolutions and/or fraction thereof, depending upon the gear ratio between the drive gear 12 and the smaller pinion gear 30. However, the drive wheel(s) DW is/are allowed to rotate continually in order to allow continuous forward motion of the vehicle upon which the present drive mechanism 10 has been installed. The difference in rotation between the pinion gear 30 and drive wheel(s) DW is provided for by a one-way clutch 34 installed on the drive wheel axle 32 between the drive wheel DW and the pinion gear 30. Such one-way clutches are well known and conventional and may comprise any of a number of different mechanisms, e.g., an internally disposed ramp(s) and jamming roller(s), ratchet and pawl mechanism, etc. Such a one-way clutch 34 locks the drive wheel DW in unison with the pinion gear 30 as the pinion gear is driven to drive the drive wheel and vehicle in a forward direction, but releases when the drive gear 12 and pedal arm 16 reciprocate back to their original position when driving force is removed from the pedal arm and the return spring 28 pulls the pedal arm back to its upright position in readiness for another power stroke.

FIG. 3 of the drawings illustrates an alternative embodiment of the pedal drive mechanism and vehicle in which the vehicle may be equipped with two drive wheels DW1 and DW2. A single first drive wheel DW1 is illustrated in solid lines in FIG. 3, with the pinion gear 30 being to the left of the drive wheel DW1 and the one-way clutch 34 positioned between the drive wheel DW1 and the pinion gear 30. However, an optional second drive wheel DW2 is shown in broken lines in FIG. 3. Where such a second drive wheel DW2 is provided, it may be necessary to provide a second one-way clutch as well. Such a secondary one-way clutch 34*b* is shown in broken lines in FIG. 3 between the pinion gear 30 and the second drive wheel DW2. Alternatively, the single one-way clutch 30 may allow one way rotation between the axle 32 and the pinion gear 30, with both drive wheels DW1 and DW2 being rotationally affixed to the single drive axle 32. The entire mechanism may be covered by a removable cover 36, shown in broken lines in FIGS. 2 and 3, with the cover 36 having a clearance slot therein for operation of the pedal arm 16.

In conclusion, the present pedal drive mechanism in its various embodiments provides a significant improvement in pedal powered mechanisms for scooters and similar vehicles. The simplification of the mechanism in comparison to the multiple gear, multiple pedal, and/or chain drives of earlier systems results in a significant savings in production and purchase prices, as well as lowering maintenance requirements. However, the present drive system also provides improved ergonomics over related art devices, with the natural rearward and downward kick or thrust of the operator matching the downward and rearward motion of the pedal arm from its substantially vertical initial orientation. Accordingly, the present pedal drive mechanism should prove to be a most welcome addition to scooters, tricycles, bicycles, and similar lightweight vehicles.

It is to be understood that the present invention is not limited to the embodiments described above, but encompasses any and all embodiments within the scope of the following claims.

I claim:

1. A pedal powered vehicle, consisting essentially of:
a vehicle frame;
a front wheel;
at least first and second drive wheels disposed upon a rear wheel axle;
a drive gear disposed upon a lateral shaft;
a pedal arm having an attachment portion immovably affixed to said drive gear and extending across a secant of said drive gear and offset from the center of said drive gear, said pedal arm having a generally upwardly disposed extension and being configured so as to be engaged by a user to power the vehicle;
a return spring secured at one end to said attachment portion of said pedal arm and at an opposite end being secured to said vehicle frame, thereby said spring urging the extension of said pedal arm to a generally upward initial position;
a pinion gear disposed upon the wheel axle, the pinion gear continuously meshing with said drive gear; and
at least first and second one-way clutches disposed upon the rear wheel axle between said pinion gear and said at least first and second drive wheels,
whereby the one-way clutches lock the drive wheels in unison with the pinion gear as the pinion gear is driven to drive the drive wheels and vehicle in a forward direction, but releases when the drive gear and pedal arm reciprocate back to their initial position when driving force is removed from the pedal arm and the return spring pulls the pedal arm to its upward position in readiness for another stroke by the user.

* * * * *